US008082641B2

(12) United States Patent
Lin et al.

(10) Patent No.: US 8,082,641 B2
(45) Date of Patent: Dec. 27, 2011

(54) METHOD OF MANUFACTURING A DUCTILE POLYMER-PIEZOELECTRIC MATERIAL COMPOSITE

(75) Inventors: Pinyen Lin, Rochester, NY (US); John Richard Andrews, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 606 days.

(21) Appl. No.: 11/756,934

(22) Filed: Jun. 1, 2007

(65) Prior Publication Data

US 2008/0299396 A1 Dec. 4, 2008

(51) Int. Cl.
*H04R 17/10* (2006.01)
*B32B 37/26* (2006.01)

(52) U.S. Cl. ......... 29/25.35; 29/841; 310/312; 310/327; 310/340; 156/152

(58) Field of Classification Search ................. 29/25.35, 29/830, 846, 841; 310/312, 327, 334, 340; 156/152; 528/73
See application file for complete search history.

(56) References Cited

U.S. PATENT DOCUMENTS 3,471,448 A * 10/1969 Heydkamp et al. ............. 528/73
5,706,820 A * 1/1998 Hossack et al. .......... 29/25.35 X
6,088,894 A * 7/2000 Oakley et al. ................ 29/25.35
6,134,776 A * 10/2000 Hoffmeyer .................. 29/830 X
6,489,706 B2 * 12/2002 Sliwa et al. ................... 310/334
6,503,204 B1 * 1/2003 Sumanaweera et al. . 29/25.35 X

FOREIGN PATENT DOCUMENTS

JP 55024485 A * 2/1980 ............... 29/25.35 X

OTHER PUBLICATIONS

Material Properties of Silicon Rubber, http://www.matbase.com/material/polymers/elastomers/silicone-rubber/properties, May 9, 2011.*

* cited by examiner

*Primary Examiner* — A. Dexter Tugbang
(74) *Attorney, Agent, or Firm* — MH2 Technology Law Group LLP

(57) ABSTRACT

Provided are free-standing ductile composites and methods of making free-standing ductile composites. The method of making a free-standing ductile composite can include providing a substrate and releasably bonding one or more piezoelectric elements to the substrate. The method can also include kerfing the piezoelectric elements in a predetermined pattern to form a kerfed pattern, filling the kerfed pattern with a polymer to form a polymer-piezoelectric composite, and lapping the polymer-piezoelectric composite. The method can further include releasing the polymer-piezoelectric composite from the substrate.

8 Claims, 6 Drawing Sheets

METHOD OF MANUFACTURING A DUCTILE POLYMER-PIEZOELECTRIC MATERIAL COMPOSITE

DESCRIPTION OF THE INVENTION

1. Field of the Invention

The subject matter of this invention relates to ink jet printing devices. More particularly, the subject matter of this invention relates to high jet density piezoelectric ink jet print heads and methods of making high jet density piezoelectric ink jet print heads.

2. Background of the Invention

Drop on demand ink jet technology is widely used in the printing industry. Drop on demand ink jet printers use either thermal or piezoelectric technology. A piezoelectric ink jet has an advantage over a thermal ink jet in that wider variety of inks can be used. Also, it is relatively easy to produce large full-width array piezoelectric ink jet printhead as compared to thermal ink jet printhead based on silicon technology. It is desirable to increase the printing resolution of an ink jet printer employing piezoelectric ink jet technology. To increase the jet density of the piezoelectric ink jet print head, one has to use thin piezoelectric materials. The desired thickness of piezoelectric material for high jet density and low power consumption is less than about 100 μm. However, piezoelectric materials in this thickness range are very fragile and difficult to process with satisfactory yields. Currently, there are few ways to produce thin piezoelectric material having a thickness of less than 100 μm for high density ink jet print heads. The first approach is to buy thin stand alone piezoelectric materials. However, using thin stand alone piezoelectric material at large size is not cost effective due to poor yield and high cost. The second approach is to lap printhead size piezoelectric material on a substrate. However, it is difficult to lap a printhead size piezoelectric material on the substrate to meet very strict product uniformity specification. The larger the piezoelectric material, the higher the variation in the thickness. In addition, the adhesion layer between the piezoelectric material and the substrate adds thickness variation in the lapping process. The third approach is to deposit thin film piezoelectric material to the desired thickness. However, it would require long deposition time for the desired thickness and additional steps for polling.

Thus, there is a need to overcome these and other problems of the prior art to provide a ductile polymer-piezoelectric material and methods of making it for high density ink jet print heads.

SUMMARY OF THE INVENTION

In accordance with the present teachings, there is a method of making a free-standing ductile composite. The method can include providing a substrate and releasably bonding one or more piezoelectric elements to the substrate. The method can also include kerfing the piezoelectric elements in a predetermined pattern to form a kerfed pattern, filling the kerfed pattern with a polymer to form a polymer-piezoelectric composite, and lapping the polymer-piezoelectric composite. The method can further include releasing the polymer-piezoelectric composite from the substrate.

According to various embodiments of the present teachings, there is a method of making an inkjet printhead. The method can include forming a polymer-piezoelectric composite. The step of forming a polymer-piezoelectric composite can include releasably bonding one or more piezoelectric elements to a substrate, kerfing the piezoelectric elements with polymers in a predetermined pattern to form a kerfed pattern in planar structures, filling the kerfed pattern with a polymer to form a polymer-piezoelectric composite, and lapping one or more surfaces of the polymer-piezoelectric composite to a desired thickness in the range of approximately 10 μm to approximately 100 μm. The method can also include forming one or more metal electrodes on at least one side of the polymer-piezoelectric composite and bonding a jet stack to a side opposite to the metal coated side of the polymer-piezoelectric composite.

According to yet another embodiment of the present teachings, there is a liquid dispensing device. The liquid dispensing device can include a free-standing polymer-piezoelectric composite including patterned piezoelectric elements bonded with polymers in a planar structure, one or more metal electrodes on at least one side of the polymer-piezoelectric composite, and a jet stack bonded to the polymer-piezoelectric composite.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
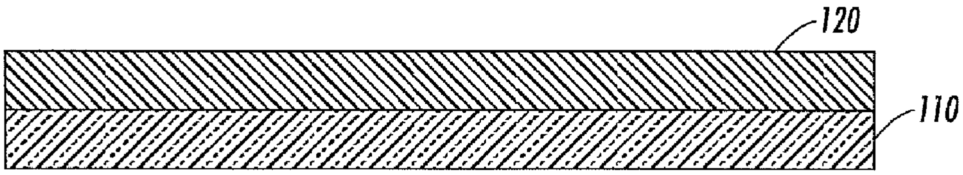
FIGS. 1-6 illustrate an exemplary method of making a free-standing ductile composite according to various embodiments of the present teachings.
Figure 2:
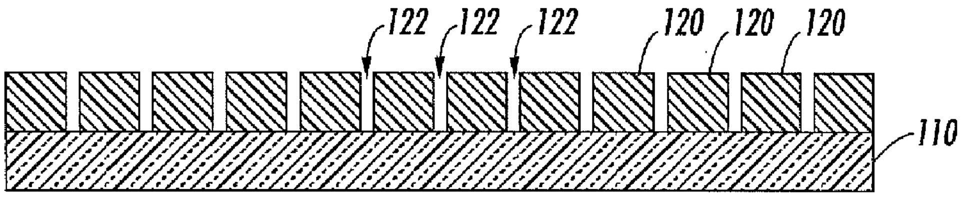
Figure 3:
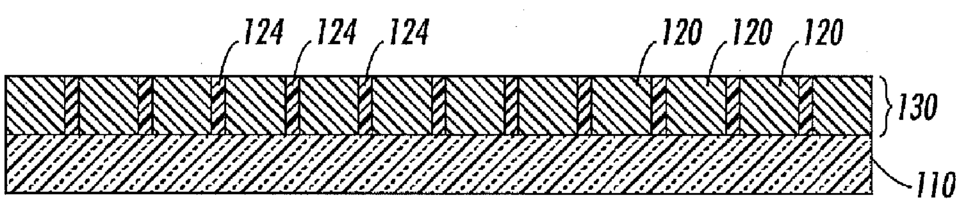
Figure 4:
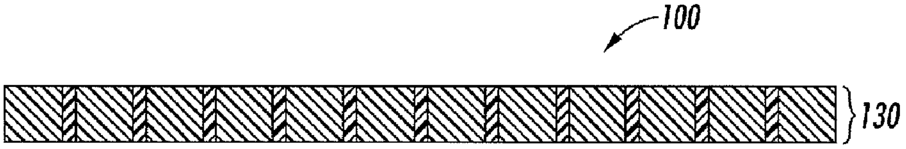

According to various embodiments of the present teachings, there is an exemplary method of making a free-standing ductile composite 100 as shown in FIGS. 1-6. The method of making a free-standing ductile composite 100 can include providing a substrate 110 and releasably bonding one or more piezoelectric elements 120 to the substrate 110 as shown in FIG. 1. The substrate 110 can be made of any rigid solid material. In various embodiments, the substrate 110 can be formed of one or more of ceramics, semiconductors, polymers, and metals. In some embodiments, the piezoelectric elements 120 can include piezoelectric material selected from a group consisting of lead zirconate titanate (PZT), barium titanate, zinc oxide, aluminum nitrate, lead titanate, lead magnesium niobate (PMN), lead nickel niobate (PNN), and lead zinc niobate. In various embodiments, the step of releasably bonding one or more piezoelectric elements 120 to the substrate 110 can include using one or more of double sided tape, heat releasable polymer, hot melt adhesive, UV releasable tape, chemical soluble polymers, and water soluble polymers to bond one or more piezoelectric elements 120 to the substrate 110. The method of making a free-standing ductile composite 100 can also include kerfing the piezoelectric elements 120 in a predetermined pattern to form a kerfed pattern 122, as shown in FIG. 2. The method can also include filling the kerfed pattern 122 with a polymer 124 to form a polymer-piezoelectric composite 130 as shown in FIG. 3, lapping the polymer-piezoelectric composite 130 (not shown), and releasing the polymer-piezoelectric composite 130 from the substrate 110 as shown in FIG. 4. In various embodiments, the kerfed pattern 122 can be filled with a polymer 124 selected from the group consisting of thermoset and thermoplastic polymers. In some embodiments, the kerfed pattern 122 can be filled with a polymer selected from at least one of epoxy, polyimide, and silicone. In other embodiments, the polymer 124 can include one or more additives and fillers. Exemplary additives and fillers include but are not limited to clay, rubbery particles, and metal oxides. In some other embodiments, the polymer 124 can have a Young's modulus less than about 20,000 psi at about 120° C. In various embodiments, the method of making a free-standing ductile composite 100 can include curing the polymer 124 before the step of releasing the polymer-piezoelectric composite 130 from the substrate 110.

Figure 5:
Figure 6:
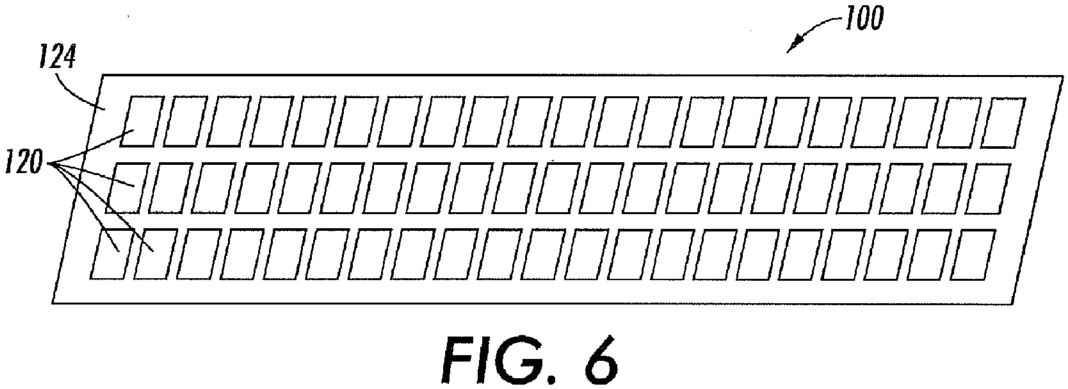

In various other embodiments, the method of making a free-standing ductile composite 100 can further include lapping one or more sides of the polymer-piezoelectric composite 130 to a desired thickness in the range of approximately 10 μm to approximately 100 μm as shown in FIG. 5 to form a free-standing ductile composite 100. The free-standing ductile composite 100 permits two-side lapping which can be preferred over one-side lapping for thickness control and uniformity. Furthermore, lapping of the polymer-piezoelectric composite 130 can also reduce piezoelectric material breakage for thin piezoelectric material having a thickness of less than about 75 microns over lapping of large homogeneous piezoelectric plates having dimensions of greater than about 10 mm by about 10 mm. FIG. 6 shows a top view of the free-standing ductile composite 100 shown in FIG. 5. In some embodiments, the method of making a free-standing ductile composite 100 can also include coating a metal to form one or more metal electrodes (not shown) on at least one side of the polymer-piezoelectric composite 130. Metal electrodes can be formed by dry methods such as, for example, thermal evaporation and e-beam evaporation, or by wet methods such as, for example, electroplating and electroless plating.

Figure 15A:
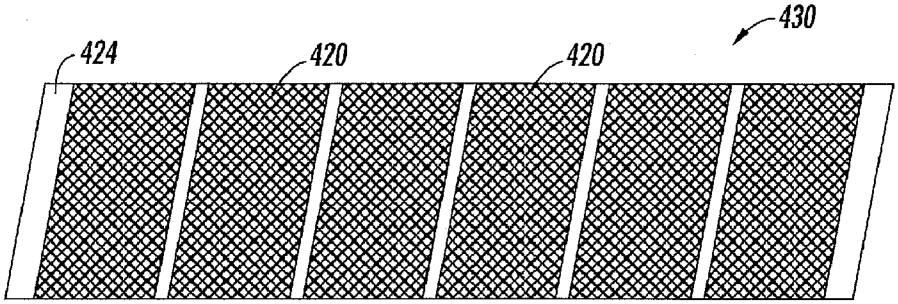
FIGS. 15A-15C illustrate several exemplary polymer filled kerfed patterns of the polymer-piezoelectric composite.
Figure 15B:
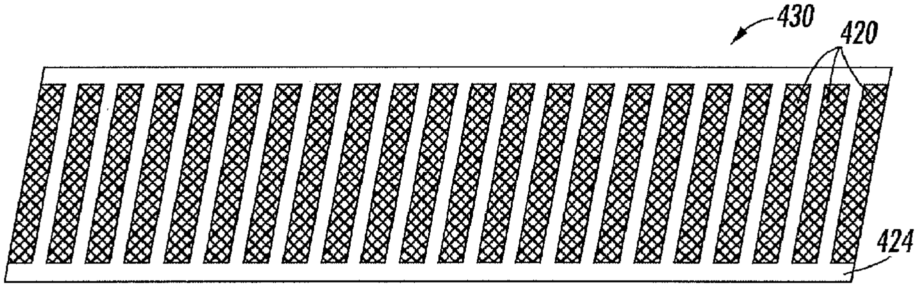
Figure 15C:
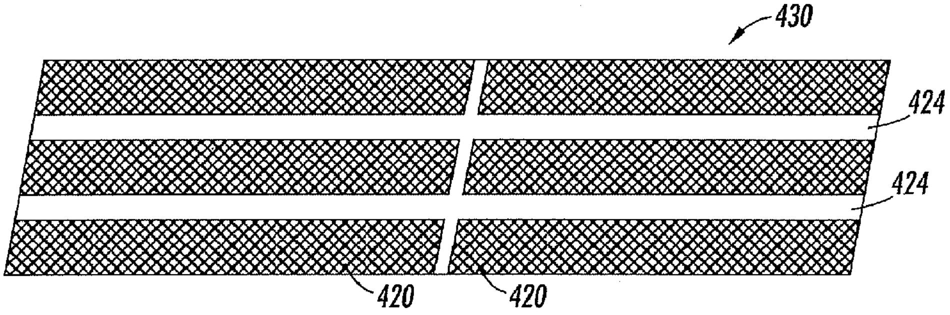

FIGS. 15A-15C illustrate several exemplary polymer 424 filled kerfed patterns of the polymer-piezoelectric composite 430. One of ordinary skill in the art would know that there can be other polymer kerfed patterns of the polymer-piezoelectric composite 430 which are not shown here.

Figure 7:
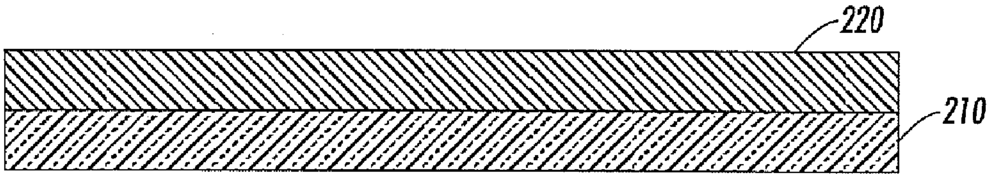
FIGS. 7-13 illustrate another exemplary method of making an inkjet printhead according to various embodiments of the present teachings.
Figure 8:
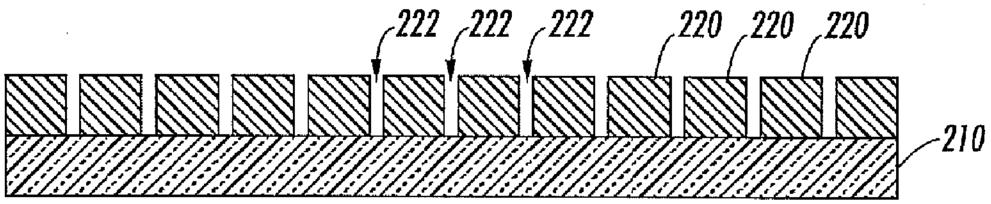
Figure 9:
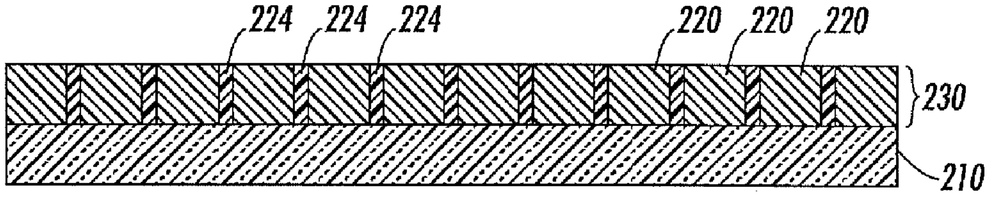
Figure 10:
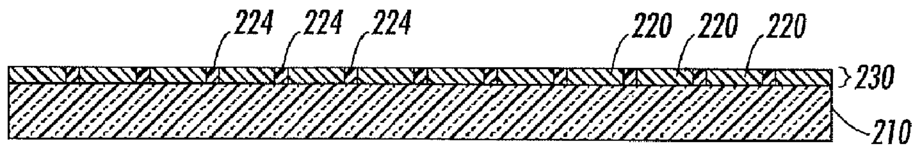
Figure 11:
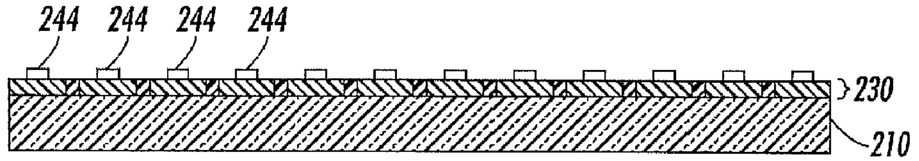
Figure 12:
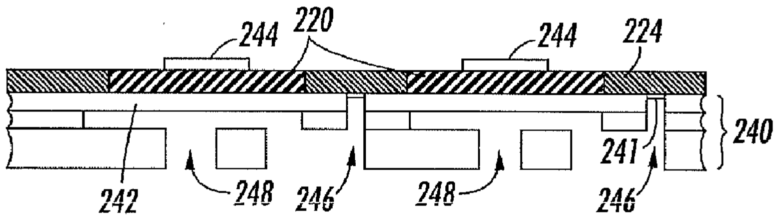

According to various embodiments, there is a method of making an inkjet printhead 200 as shown in FIGS. 7-13. The method can include forming a polymer-piezoelectric composite 230 including releasably bonding one or more piezoelectric elements 220 to a substrate 210 as shown in FIG. 7 and kerfing the piezoelectric elements 220 in a predetermined pattern to form a kerfed pattern 222, as shown in FIG. 8. The step of forming a polymer-piezoelectric composite 230 can also include filling the kerfed pattern 222 with a polymer 224 to form a polymer-piezoelectric composite 230 as shown in FIG. 9 and lapping one or more surfaces of the polymer-piezoelectric composite 230 to a desired thickness in the range of approximately 10 μm to approximately 100 μm as shown in FIG. 10. In some embodiments, the method can further include releasing the polymer-piezoelectric composite 230 from the substrate 210 before the step of lapping the polymer-piezoelectric composite. The method of making an inkjet printhead 200 can also include forming one or more metal electrodes 244 on at least one side of the polymer-piezoelectric composite 230 as shown in FIG. 11. In some embodiments, the metal electrodes 244 can be patterned individually over each of the kerfed piezoelectric elements 220, as shown in FIG. 11. In other embodiments, the metal electrodes 244 can be unpatterned as a ground electrode (not shown). In some embodiments, the unlapped side of the polymer-piezoelectric composite 230 can also be coated with metal to form metal electrodes 244. The method can further include bonding a jet stack 240 to the polymer-piezoelectric composite 230, as shown in FIG. 12. In various embodiments, the jet stack 240 can include a diaphragm 242, a plurality of port holes 246, a first plurality of apertures 248. In some embodiments, the bonding of the polymer-piezoelectric composite 230 to the jet stack 240 can be done using an adhesive 241 including but not limited to, for example epoxy, silicone, and bismaleimide. In other embodiments, the adhesive 241 can be dispensed on the jet stack 240. In some other embodiments, the adhesive 241 can be dispensed on the polymer-piezoelectric composite 230. In various embodiments, a thin layer of transfer adhesive can be used. Yet in other embodiments, a bead of adhesive can be used. The step of bonding the polymer-piezoelectric composite 230 to the jet stack 240 can also include thermal curing at a temperature in the range of about 100° C. to about 250° C.

Figure 13:
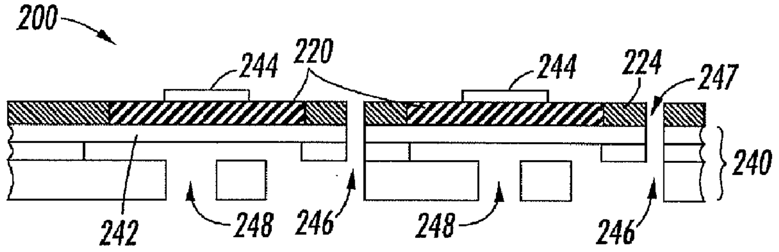

In various embodiments, the method of making an ink jet printhead 200 can also include forming one or more ink port holes 247 through the polymer of the polymer-piezoelectric composite 230 using the jet stack as a mask, as shown in FIG. 13. The ink port holes 247 through the polymer 224 of the polymer-piezoelectric composite 230 can be formed by any suitable method. In some embodiments, the polymer 224 can be laser ablated using the jet stack 240 as a mask to form the extended port holes 247 through the polymer.224. In other embodiments, the polymer 224 can be laser ablated while the polymer-piezoelectric composite 230 is still on the substrate 210. In some embodiments, the step of ablating the polymer 224 can include using at least one of a $CO_2$ laser, an excimer laser, a solid state laser, a copper vapor laser, and a fiber laser. One of ordinary skill in the art would know that the $CO_2$ laser and the excimer laser can typically ablate polymers including epoxies. The $CO_2$ laser can have a low operating cost and can be used for high volume production. The $CO_2$ laser beam that can over-fill the mask could sequentially illuminate each port hole 246 to form the extended port holes 247 through the polymer 224 and remove an excess portion of the adhesive 241 that flows into the port hole 246 from the bonding of the polymer-piezoelectric composite 230 to the jet stack 240. Furthermore, one of ordinary skill in the art would also know that the excimer laser can be used to flood illuminate or can be used with special optics to illuminate each of the port holes 246 to form the extended port holes 247 though the polymer 224 and remove an excess portion of the adhesive 241 from the bonding of the polymer-piezoelectric composite 230 to the jet stack 240.

Figure 14:
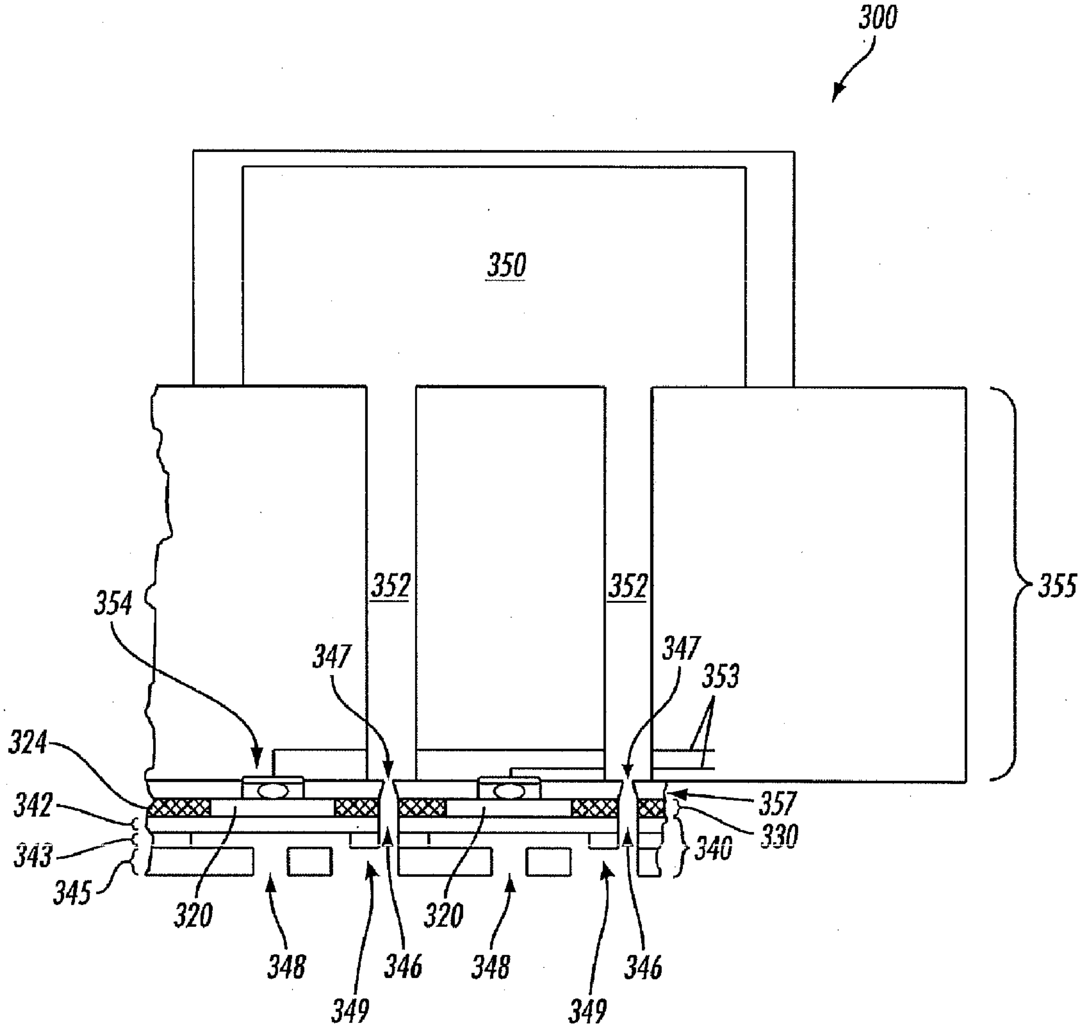
FIG. 14 illustrates an exemplary liquid dispensing device according to various embodiments of the present teachings.

FIG. 14 shows a schematic illustration of an exemplary liquid dispensing device 300. The liquid dispensing device 300 can include a polymer-piezoelectric composite 330 including patterned piezoelectric elements 320 bonded with polymers 324 in a planar structure, one or more metal electrodes (not shown) on at least one side of the polymer-piezoelectric composite. The liquid dispensing device 300 can also include a jet stack 340 bonded to the polymer-piezoelectric composite 330 including a diaphragm 342 having an ink outlet side, a body plate 343 disposed under the ink outlet side of the diaphragm 343, and an inlet plate 345 including a first plurality of apertures 348 disposed under the body plate 343, wherein the diaphragm 342 includes a plurality of port holes 346. In various embodiments, the polymer-piezoelectric composite 330 can be bonded to a side opposite to the ink outlet side of the diaphragm 342 such that the polymer 324 covers the plurality of port holes 346. In some embodiments, the liquid dispensing device 300 can include a laser ablated ink port hole 347 extending each of the plurality of port holes 346 through the polymer 324. In some other embodiments, the laser ablated hole 347 can include a tapered cross section. In various embodiments, the liquid dispensing device 300 can further include an aperture plate (not shown) including a second plurality of apertures bonded to the inlet plate 345 of the jet stack 340, wherein the second plurality of apertures are substantially aligned with the first plurality of apertures 348. The liquid dispensing device 300 can also include a circuit board 355 including a plurality of vias 352, a plurality of contact pads 354, and a plurality of electrical connections 353 bonded to the piezoelectric-polymer composite 330 with a standoff layer 357, wherein the standoff layer 357 provides a fluid seal between the circuit board 355 and the plurality of port holes 346. The liquid dispensing device 300 can further include an ink manifold 350, wherein each of the plurality of vias 352 and each of the plurality of port holes 346, 347 can provide an individual vertical inlet connecting the ink manifold 350 with each of the second plurality of apertures.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a free-standing ductile composite comprising:

providing a substrate;

releasably bonding one or more piezoelectric elements to the substrate;

kerfing, while the one or more piezoelectric elements are releasably bonded to the substrate, the piezoelectric elements in a predetermined pattern to form a kerfed pattern;

filling the kerfed pattern with a polymer selected from the group consisting of polyimide and silicone and having a Young's modulus less than about 20,000 psi at about 120° C. to form a polymer-piezoelectric composite;

lapping the polymer-piezoelectric composite;

releasing the polymer-piezoelectric composite from the substrate; and forming a plurality of ink port holes through the polymer.

2. The method of claim 1 wherein the substrate comprises one or more of ceramics, semiconductors, and metals.

3. The method of claim 1 wherein the step of releasably bonding one or more piezoelectric elements to the substrate comprises using one or more of double sided tape, heat releasable polymers, hot melt adhesives, UV releasable tape, chemical soluble polymers, and water soluble polymers to bond one or more piezoelectric elements to the substrate.

4. The method of claim 1, wherein the polymer comprises one or more additives and fillers.

5. The method of claim 1 further comprising curing the polymer before the step of releasing the polymer-piezoelectric composite from the substrate.

6. The method of claim 1 further comprising lapping one or more sides of the polymer-piezoelectric composite to a desired thickness in the range of approximately 10 μm to approximately 100 μm.

7. The method of claim 1 further comprising coating a metal to form one or more metal electrodes on at least one side of the polymer-piezoelectric composite.

8. The method of claim 1, further comprising:

filling the kerfed pattern with the polymer while the one or more piezoelectric elements are releasably bonded to the substrate;

curing the polymer while the one or more piezoelectric elements are releasably bonded to the substrate; and forming an ink port hole between each of the plurality of piezoelectric elements during the formation of the plurality of ink port holes.

* * * * *